(12) United States Patent
Abraham

(10) Patent No.: US 9,564,689 B2
(45) Date of Patent: *Feb. 7, 2017

(54) MIMO ANTENNA SYSTEM

(71) Applicant: XIRRUS, INC., Thousand Oaks, CA (US)

(72) Inventor: Hartenstein Abraham, Chatsworth, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/178,019

(22) Filed: Feb. 11, 2014

(65) Prior Publication Data

US 2014/0266944 A1    Sep. 18, 2014

Related U.S. Application Data

(63) Continuation of application No. 12/987,040, filed on Jan. 7, 2011, now Pat. No. 8,669,913.

(51) Int. Cl.
*H01Q 19/10* (2006.01)
*H04B 7/04* (2006.01)
*H01Q 13/10* (2006.01)
*H01Q 21/00* (2006.01)
*H04W 84/12* (2009.01)
*H04L 5/00* (2006.01)
*H04W 16/28* (2009.01)

(52) U.S. Cl.
CPC .............. *H01Q 19/10* (2013.01); *H01Q 13/10* (2013.01); *H01Q 21/00* (2013.01); *H04B 7/0413* (2013.01); *H04W 84/12* (2013.01); *H04L 5/0023* (2013.01); *H04W 16/28* (2013.01)

(58) Field of Classification Search
CPC ......... H01Q 19/10; H01Q 21/00; H01Q 13/10
USPC ................................. 343/834–837
See application file for complete search history.

(56) References Cited

U.S. PATENT DOCUMENTS 7,411,554 B2 *  8/2008  Jung ...................... H01Q 1/243
                                                343/700 MS
8,669,913 B2 *  3/2014  Hartenstein .................. 343/836

* cited by examiner

*Primary Examiner* — Hoang V Nguyen
(74) *Attorney, Agent, or Firm* — SoCal IP Law Group LLP; John E. Gunther; Steven C. Sereboff

(57) ABSTRACT

A multiple input, multiple output ("MIMO") antenna system is provided for operation on a radio frequency ("RF") module that may be used in a wireless access device. The MIMO antenna system includes a plurality of multi-band antenna elements connected to a radio in a MIMO configuration. The multi-band antenna elements and the radio are configured to operate on a RF module. A reflector is formed on the RF module to contain the plurality of multi-band antenna elements and to concentrate signal communication in a sector, the plurality of multi-band antenna elements oriented to provide a sector coverage pattern formed by beam patterns generated by each of the multi-band antenna elements.

9 Claims, 6 Drawing Sheets

MIMO ANTENNA SYSTEM

BACKGROUND OF THE INVENTION

1. Field of the Invention

This invention relates generally to communication devices and more particularly to antennas for Multiple-Input, Multiple-Output (MIMO) media access controllers.

2. Related Art

The use of wireless communication devices for data networking continues to grow at a rapid pace. Data networks that use "WiFi" ("Wireless Fidelity"), also known as "Wi-Fi," are relatively easy to install, convenient to use, and supported by the IEEE 802.11 standard. WiFi data networks also provide performance that makes WiFi a suitable alternative to a wired data network for many business and home users.

WiFi networks operate by employing wireless access points that provide users, having wireless (or "client") devices in proximity to the access point, with access to varying types of data networks such as, for example, an Ethernet network or the Internet. The wireless access points include a radio that operates according to the standards specified in different sections of the IEEE 802.11 specification. Generally, radios in the access points communicate with client devices by utilizing omni-directional antennas that allow the radios to communicate with client devices in any direction. The access points are then connected (by hardwired connections) to a data network system that completes the access of the client device to the data network.

The three standards that define the radio configurations are:

1. IEEE 802.11a, which operates on the 5 GHz frequency band with data rates of up to 54 Mbs;
2. IEEE 802.11b, which operates on the 2.4 GHz frequency band with data rates of up to 11 Mbs; and
3. IEEE 802.11g, which operates on the 2.4 GHz frequency band with data rates of up to 54 Mbs.

The 802.11b and 802.11g standards provide for some degree of interoperability. Devices that conform to 802.11b may communicate with 802.11g access points. This interoperability comes at a cost as access points will switch to the lower data rate of 802.11b if any 802.11b devices are connected. Devices that conform to 802.11a may not communicate with either 802.11b or 802.11g access points. 1In addition, while the 802.11a standard provides for higher overall performance, 802.11a access points have a more limited range compared with the range offered by 802.11b or 802.11g access points.

Each standard defines 'channels' that wireless devices, or clients, use when communicating with an access point. The 802.11b and 802.11g standards each allow for 14 channels. The 802.11a standard allows for 23 channels. The 14 channels provided by 802.11b and 802.11g include only 3 channels that are not overlapping. The 12 channels provided by 802.11a are non-overlapping channels.

Access points provide service to a limited number of users. Access points are assigned a channel on which to communicate. Each channel allows a recommended maximum of 64 clients to communicate with the access point. In addition, access points must be spaced apart strategically to reduce the chance of interference, either between access points tuned to the same channel, or to overlapping channels. In addition, channels are shared. Only one user may occupy the channel at any given time. As users are added to a channel, each user must wait longer for access to the channel thereby degrading throughput.

One way to increase throughput is to employ multiple radios at an access point. Another way is to use multiple input, multiple output ("MIMO") to communicate with mobile devices in the area of the access point. MIMO has the advantage of increasing the efficiency of the reception. However, MIMO entails using multiple antennas for reception and transmission at each radio. The use of multiple antennas may create problems with space on the access point, particularly when the access point uses multiple radios. In some implementations of multiple radio access points, it is desirable to implement a MIMO implementation in the same space as a previous non-MIMO implementation.

Current MIMO implementations may utilize 2-3 antennas per radio. When more than one antenna is used, the mutual coupling among the antennas due to their proximity may degrade the performance of the access point and reduce the throughput. The problem with mutual coupling is magnified when multiple radios are used in an access point.

It would be desirable to implement MIMO in multiple radio access points without significant space constraints such that it would be possible to substitute a non-MIMO multiple radio access point with a MIMO multiple radio access point in the same space. It would also be desirable to implement MIMO in a multiple radio access point while maximizing the performance of the access point in coverage and quality of service (QOS).

SUMMARY

In view of the above, a multiple input, multiple output ("MIMO") antenna system is provided for operation on a radio frequency ("RF") module that may be used in a wireless access device. The MIMO antenna system includes a plurality of multi-band antenna elements connected to a radio in a MIMO configuration. The multi-band antenna elements and the radio are configured to operate on a RF module. A reflector is formed on the RF module to contain the plurality of multi-band antenna elements and to concentrate signal communication in a sector, the plurality of multi-band antenna elements oriented to provide a sector coverage pattern formed by beam patterns generated by each of the multi-band antenna elements. PCB.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The examples of the invention described below can be better understood with reference to the following figures. The components in the figures are not necessarily to scale, emphasis instead being placed upon illustrating the principles of the invention. In the figures, like reference numerals designate corresponding parts throughout the different views.

FIG. 4E is a cross-sectional view of the beam patterns shown in FIG. 4A at broken line E-E' of FIG. 4A.

DETAILED DESCRIPTION

In the following description of the preferred embodiment, reference is made to the accompanying drawings that form a part hereof, and which show, by way of illustration, a specific embodiment in which the invention may be practiced. Other embodiments may be utilized and structural changes may be made without departing from the scope of the present invention.

A wireless local area network ("WLAN') access device that uses a MIMO antenna array is disclosed. The WLAN access device may include a circular housing having a plurality of radial sectors and a plurality of antenna arrays, each antenna array arranged within individual radial sectors of the plurality of radial sectors.

In general, the antenna arrays used in the WLAN access device include multisector antenna systems that radiate a plurality of radiation patterns that "carve" up the airspace into equal sections of space or sectors to assure continuous coverage for a client device in communication with the WLANAA. The radiation pattern overlap may also ease management of a plurality of client devices by allowing adjacent sectors to assist each other. For example, adjacent sectors may assist each other in managing the number of client devices served with the highest throughput as controlled by an array controller. The WLANAA provides increased directional transmission and reception gain that allow the WLANAA and its respective client devices to communicate at greater distances than standard omnidirectional antenna systems, thus producing an extended coverage area when compared to an omni-directional antenna system.

The WLANAA is capable of creating a coverage pattern that resembles a typical omni-directional antenna system but covers approximately four times the area and twice the range. In general, each radio frequency ("RF") sector is assigned a non-overlapping channel by an Array Controller.

Examples of implementations of a WLANAA in which multiple input, multiple output ("MIMO") schemes may be implemented, and in which example implementations consistent with the present invention may also be implemented are described in:

PCT Patent Application No. PCT/US2006/008747, filed on Jun. 9, 2006, titled "WIRELESS LAN ANTENNA ARRAY," and incorporated herein by reference in its entirety, and U.S. patent application Ser. No. 12/269,567 filed on Nov. 12, 2008, titled "MIMO Antenna System," and incorporated herein by reference in its entirety.

Figure 1:
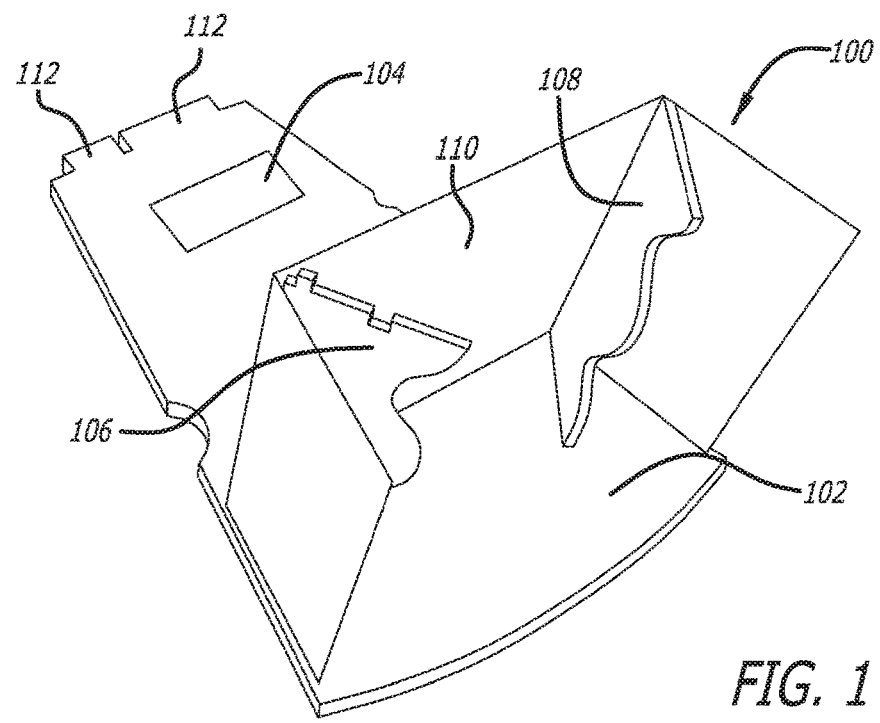
FIG. 1 is a perspective view of an example of a radio frequency ("RF") module that uses a 2-element multi-band MIMO antenna array.

FIG. 1 is a perspective view of an example of a radio frequency ("RF") module 100 that uses a 2 element multi-band MIMO antenna array. The RF module 100 in FIG. 1 includes a printed circuit board ("PCB") 102, RF processing circuitry 104, a first antenna array element 106, a second antenna array element 108, a reflector 110, and an edge connector 112 on the PCB 102. The 2-element multi-band MIMO antenna array in the RF module 100 in FIG. 1 includes two antenna elements 106, 108.

As described below with reference to FIGS. 2A-2C, eight, twelve, or sixteen RF modules 102 may be connected radially around the controller printed circuit board to create a 365° coverage area around the controller. Each RF module 100 is configured to implement a portion of the 365° coverage area. Each portion is substantially pie-shaped in accordance with the substantially pie shape of the RF modules 100. The coverage pattern may be configured by the reflector 110, the position and layout of the antenna elements 106, 108, and the operation of the electronic components implemented on the RF module 100.

The reflector 110 is configured to enhance the gain/directivity of the antenna elements 106, 108. The reflector 110 may also be shaped to enhance isolation between adjacent RF modules 100 as well as front-to-back isolation. For example, as shown in FIG. 1, the reflector 110 may be implemented as a three-sided wall that forms two corners on opposite sides of a first side positioned perpendicular to a radial axis that may extend from a center of a circular configuration of the WLAN access device. The other two sides of the three-sided wall may form obtuse angles with the first wall to direct radiation in the desired coverage pattern. The antenna elements 106, 108 may be positioned in the corners formed by the three-sided wall of the reflector 110. The reflector 110 may be made of any suitable material. In one implementation, the reflector 110 is made of an aluminum sheet.

The PCB 102 may be any suitable printed circuit board implementation. The PCB 102 shown in FIG. 1 is substantially pie-shaped to fit in a circular configuration with other RF modules 102. The reflector 110 may be mounted on the PCB 102 with the antenna elements 106, 108 mounted within the reflector 110. The antenna elements 106, 108 and the reflector 110 cooperate to radiate a sector coverage pattern outward in a radial direction when mounted in an access device.

The RF processing circuitry 104 may be designed into the PCB 102 to provide RF signal processing functions. The RF processing circuitry 104 may be configured to operate with a controller to implement any suitable wireless LAN system. The RF processing circuitry 104 may communicate with the controller via the edge connectors 112.

Figure 2A:
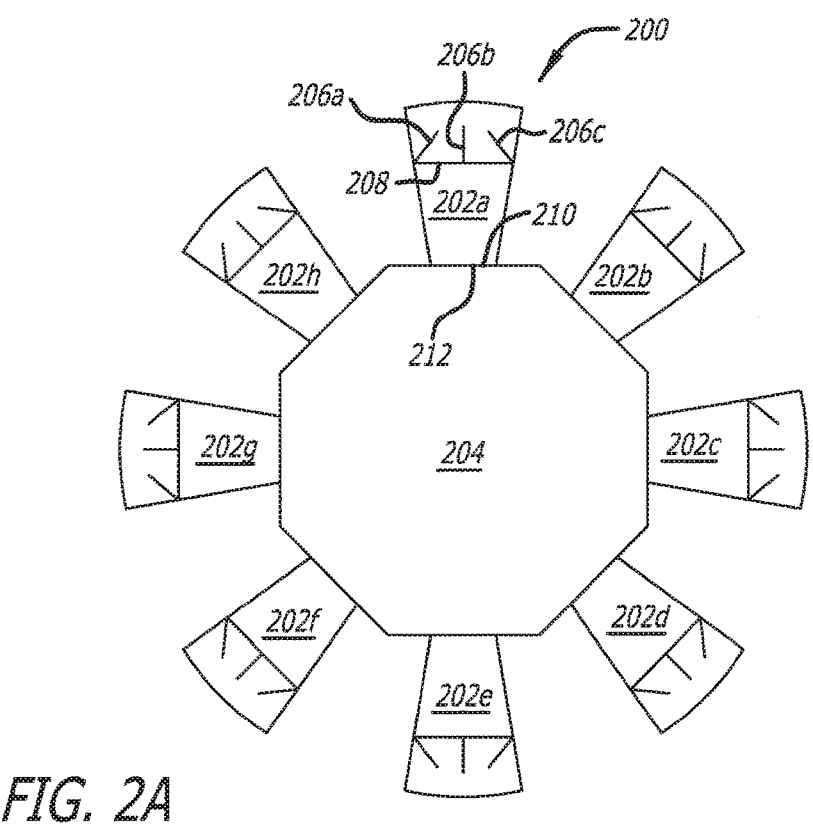
FIG. 2A is a schematic diagram illustrating a top view of an example of an S-port Wireless Local Area Network ("WLAN") access device implemented with an example of the RF module in FIG. 1 that includes a 3-element multi-band MIMO antenna array.
Figure 2B:
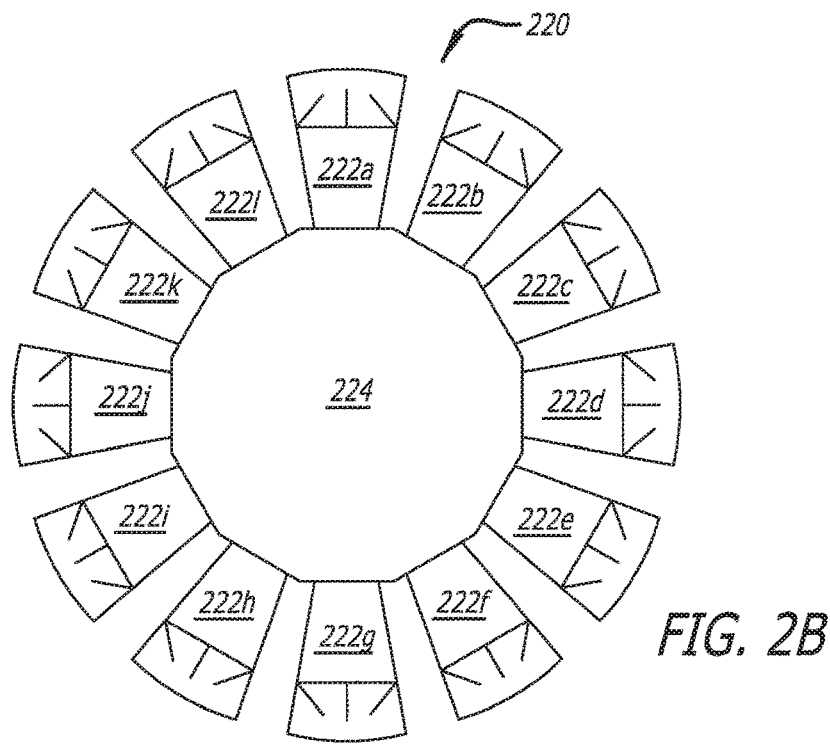
FIG. 2B is a schematic diagram illustrating a top view of an example of a 12-port WLAN access device that uses an example of the RF module shown in FIG. 2A.
Figure 2C:
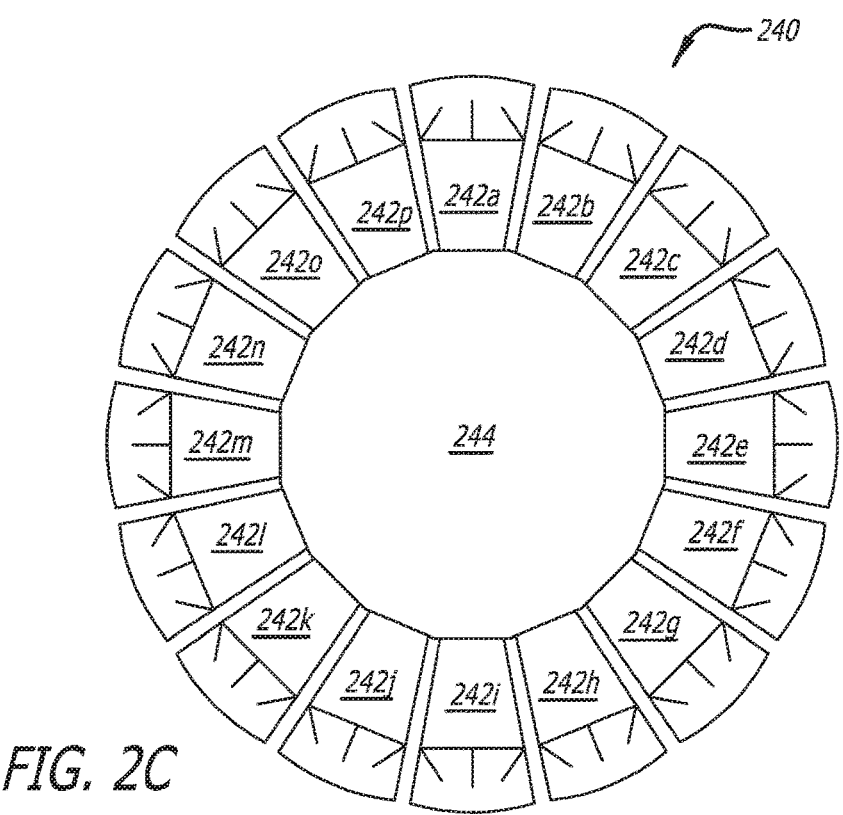
FIG. 2C is a schematic diagram illustrating a top view of an example of a 16-port WLAN access device that uses an example of the RF module shown in FIG. 2A.

FIGS. 2A-2C illustrate example WLAN access devices implemented using an example of the RF module 100 in FIG. 1 as an 8-port WLAN access device (FIG. 2A), a 12-port WLAN access device (FIG. 2B), and a 16-port WLAN access device (FIG. 2C). The example of the RF module 100 that is used in the implementations illustrated in FIGS. 2A-2C uses 3-element multi-band MIMO antenna arrays although a 2-element arrays may be used as well. The RF modules may all be identical to one another and connect to the controller for configuration and control during implementation. In one example, the controller is configured for each WLAN access device based on the number of ports (8, 12, 16).

FIG. 2A is a schematic diagram illustrating a top view of an example of an S-port WLAN access device 200 implemented with eight RF modules 202a-h, each of which includes a 3-element antenna array 206a-c. Each RF module 202a-h also includes a reflector 208, and an edge connector 210, which connects to a mating edge connector 212 on an 8-port WLAN controller 204. The RF modules 202a-h in FIG. 2A are configured and arranged to provide coverage patterns in eight sectors. One radio transceiver in each of the RF modules 202a-h communicates via the three-element antenna array 206a-c connected according to a MIMO scheme. The eight sectors combine to provide a 360° coverage around the WLAN access device 200.

FIG. 2B is a schematic diagram illustrating a top view of an example of a 12-port WLAN access device 220 implemented with 12 RF modules 222a-1. The 12 RF modules 222a-1 each include 3-element antenna arrays similar to the RF modules 202a-h shown in FIG. 2A. The 12 RF modules 222a-1 are connected to a 12-port WLAN controller 224.

FIG. 2C is a schematic diagram illustrating a top view of an example of a 16-port WLAN access device 240 implemented with 16 RF modules 242a-p. The 16 RF modules 242a-p each include 3-element antenna arrays similar to the RF modules 202a-h shown in FIG. 2A. The 16 RF modules 242a-p are connected to a 16-port WLAN controller 244.

Figure 3:
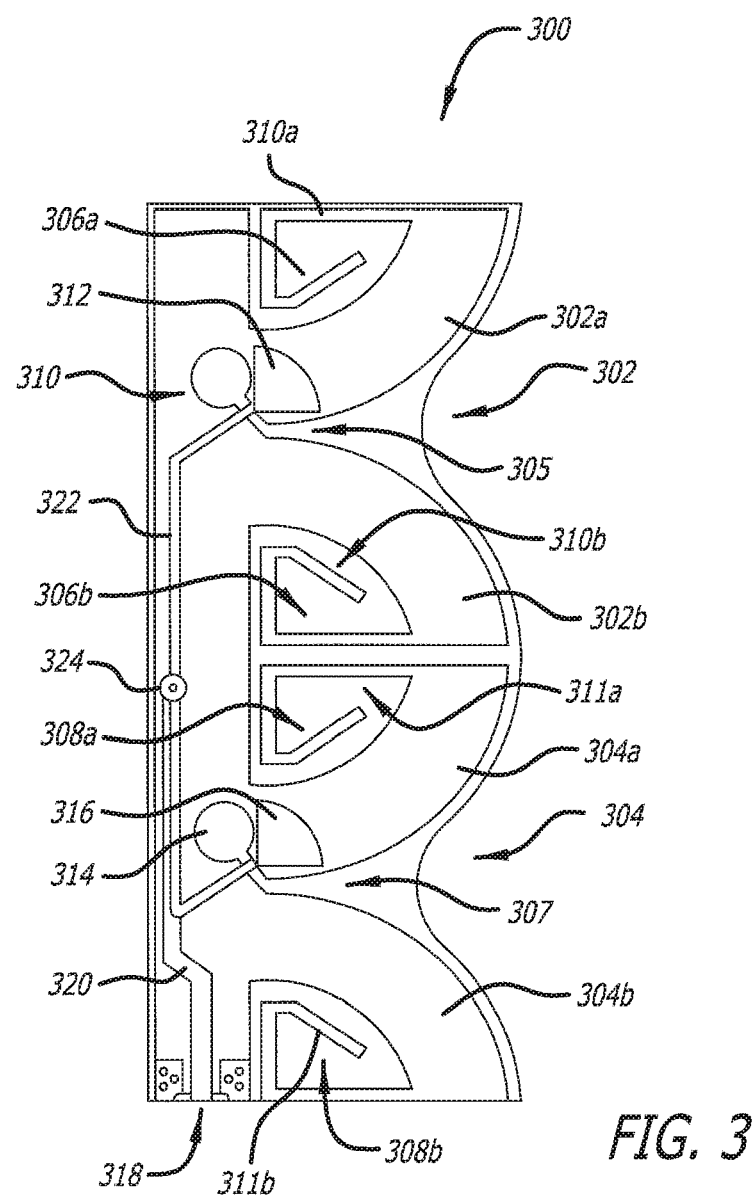
FIG. 3 is a schematic diagram of an example implementation of a multi-band antenna element.

FIG. 3 is a schematic diagram of an example implementation of a multi-band antenna element 300 that may be used as a MIMO antenna array. The antenna element 300 in FIG. 3 includes two stacked Vivaldi Notch antennas 302, 304 implemented as a multi-layer board of dielectric substrates. The multi-layer board may include traces and patterns of metal on different layers of the board. In one example implementation, a three-layer board is used in the antenna element 300 shown in FIG. 3. In example implementations, the Vivaldi Notch antenna is a broadband antenna structure that can cover bandwidth of 10:1 or more.

In a middle layer of the three-layer board, a 'V' shaped metallic layer may be formed in the shape of each notch antenna 302, 304 shown in FIG. 3. A first 'V' shaped metallic element, which forms a top notch antenna 302 includes a top curved portion 302a and a bottom curved portion 302b. A second 'V' shaped metallic element, which forms the bottom notch antenna 304 includes a top curved portion 304a and a bottom curved portion 302b. The top and bottom curved portions 302a, 304a, and 302b, 304b, respectively, extend from a center gap 305 and 307 that forms the 'V' shaped pattern. The curved portions 302a, 302b, 304a, 304b may be formed in dimensions suitable for receiving and transmitting signals in the frequency bands needed according to the requirements of the WLAN access device. In one example, the antenna elements 302, 304 are dimensioned to receive and transmit signals according to the IEEE 802.11a/b/g/d/n specifications.

The notch antennas 302, 304 in FIG. 3 are configured to operate within the space formed by the reflector 106 to provide the desired sector coverage pattern. The notch antennas 302, 304 used as corner antennas in the corners of the reflector 106 are placed at a point in the reflector corners that put their phase centers about a quarter wavelength ($\lambda/4$) from the corresponding corner. In order for the phase center of the antenna to coincide with that of the corner of the reflector, the antenna needs to shrink in size. As such the 2.4 Ghz band resonates outside of the notch zone under the curved portions 302a, 302b of the antennas 302. The notch antennas 302, 304 in FIG. 3 may be configured to increase the gain of the antenna array. The notch antennas 302, 304 form an array that narrows the elevation beam while the azimuth coverage stays the same, which is similar to operation of a single notch antenna.

In order to cover the 2.4 Ghz band, the top curved portion 302a of the top notch antenna 302 extends to form a narrowed strip that is curved within the area under the top curved portion 302a. This first narrowed strip functions as a top 2.4 Ghz resonating arm 310a on the top notch antenna 302. The bottom curved portion 302b of the top notch antenna 302 extends to form a narrowed strip that is curved within the area under the bottom curved portion 302b. This second narrowed strip functions as a bottom 2.4 Ghz resonating arm 310b on the top notch antenna 302. The top curved portion 304a of the bottom notch antenna 304 extends to form a narrowed strip that is curved within the area under the top curved portion 304a. This third narrowed strip functions as a top 2.4 Ghz resonating arm 311a on the bottom notch antenna 304. The bottom curved portion 304b of the bottom notch antenna 304 extends to form a narrowed strip that is curved within the area under the top curved portion 304b. This fourth narrowed strip functions as a bottom 2.4 Ghz resonating arm 311b on the bottom notch antenna 304. The four narrow strips shown in FIG. 3 are coplanar with the top and bottom curved portions 302a, 304a, and 302b, 304b, respectively, which may be in a middle layer of the three-layer board. However, in other implementations, portions of the notch antennas 302, 304 including the narrow strips may be etched on other layers. The narrow strips may also be formed in other shapes suitable for capturing signals within the desired frequency ranges.

The top notch antenna 302 may connect to a top feedline 322a, which is formed by a metallic trace on another layer, such as on a top layer, which extends to a main feedpoint 318 via common feedline 320 from common feedpoint 324. The top notch antenna 302 may connect to the top feedline 322a at a top notch short stub 310, which couples to the top feedline 322a via a top notch antenna feedline 312. The shape and dimensions of the top notch short stub 310 and the top notch antenna feedline 312 may be selected in order to provide a proper match with the feedline all the way to the main feedpoint 318 in the frequency range of interest.

The bottom notch antenna 304 may connect to a bottom feedline 322b, which is formed by a metallic trace on another layer, such as on a top layer, which extends to a main feedpoint 318 via common feedline 320 from common feedpoint 324. The bottom notch antenna 304 may connect to the bottom feedline 322b at a bottom notch short stub 314, which couples to the bottom feedline 322b via a bottom notch antenna feedline 316. The shape and dimensions of the bottom notch short stub 314 and the bottom notch antenna feedline 316 may be selected in order to provide a proper match with the feedline all the way to the main feedpoint 318 in the frequency range of interest.

It is noted that the implementation of the multi-band antenna element 300 described above is a dual-band antenna for wireless communication pursuant to 802.11a/n and 802.11b/g/n specifications. The multi-band antenna element 300 may be configured for implementations based on other specifications. In addition, the multi-band antenna element 300 uses Vivaldi notch antennas; however, any suitable multi-band antenna designed may be used. The 2.4 Ghz resonating arms are used to optimize the coverage of signals around 2.4 Ghz. However, other suitable shapes may be used as well.

Two or three multi-band antenna elements 300 (in FIG. 3) may be mounted in the RF module 100 (in FIG. 1) and connected to the radio transceiver. In operation, the multi-band antenna elements form coverage patterns, and using spatial diversity provides the desired sector coverage patterns. The sector coverage patterns may be configured to ensure a desired amount of overlap of coverage as well as a desired amount of isolation in selected areas. The sector coverage patterns may be configured by the orientation of the multi-band antenna element 300 within the RF module 100 (FIG. 1), and by controlling operational factors that determine the power, sensitivity, range and other factors. Each multi-band antenna element forms a coverage beam, which is combined with the other coverage beams to form the sector's coverage pattern. The overlap between beams may be controlled along the azimuth by the use of the notch antennas. The azimuth coverage of the individual notch antennas is a function of the antenna space formed by the phase center and the reflector corner.

FIGS. 4A-4D are schematic diagrams illustrating the use of spatial diversity to generate a sector coverage pattern using beam patterns generated by each of the antenna elements in the 3-element multi-band MIMO antenna array.

Figure 4A:
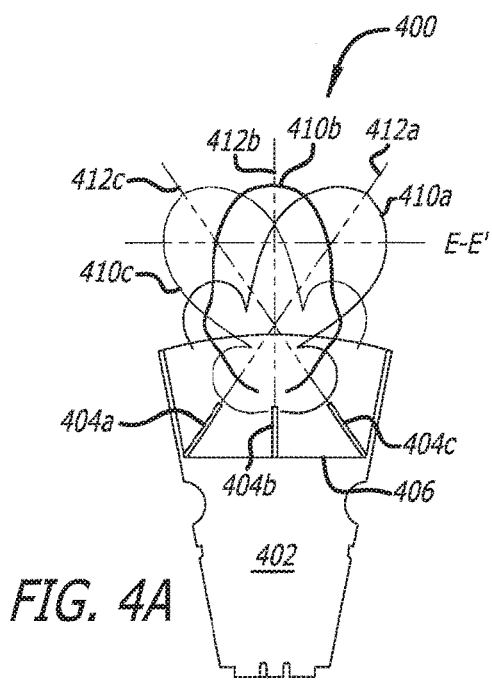
FIGS. 4A-4E are schematic diagrams illustrating the use of spatial diversity to generate a sector coverage pattern using beam patterns generated by each of the antenna elements in the 3-element multi-band MIMO antenna array.

FIG. 4A illustrates a spatial diversity 400 obtained from the combination of the beam patterns from each antenna element. The spatial diversity 400 in FIG. 4A is generated by an RF module 402 having three multi-band antenna elements 404a-c, and a reflector 406. The three multi-band antenna elements 404a-c may be implemented as described above with reference to FIG. 3. Any suitable multi-band antenna element may be used instead. FIG. 4A depicts a 3-element multi-band antenna array formed by the three multi-band antenna elements 404a-c.

Figure 4B:
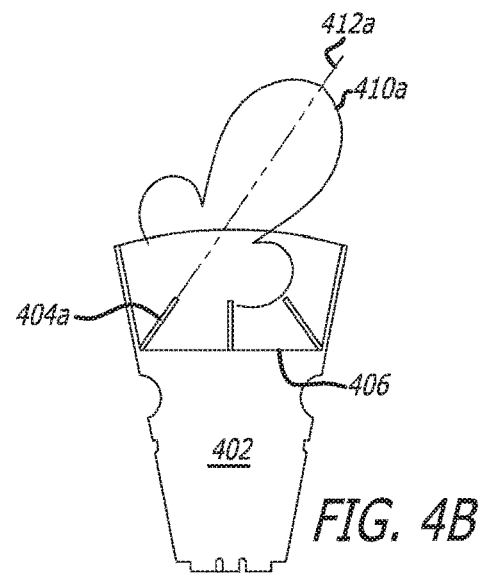
Figure 4C:
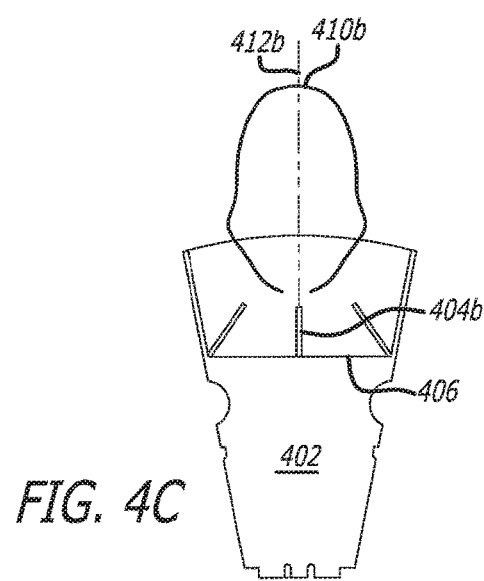
Figure 4D:
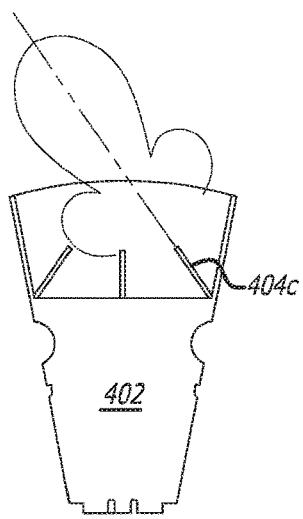

The RF module 402 generates three beams 410a-c using the three multi-band antenna elements 404a-c, each antenna element 404a-c generating a corresponding beam 410a-c. FIG. 4B depicts a first beam 410a generated by the first of the three antenna elements 404a positioned in the lower-left hand corner of the reflector 406. The first beam 410a radiates along a first center axis 412a extending from the first antenna element 404a. As shown in FIG. 4C, a center beam 410b is formed by a center one of the three antenna elements 404b. The center beam 410b radiates along a second center axis 412b extending from the center antenna element 404b. As shown in FIG. 4D, a third beam 410c is generated by a third of the three antenna elements 404c. The third beam 410c radiates along a third center axis 412c extending from the center antenna element 404c. The three resulting beam 410a-c are arrange in a spatial diversity setting where the beams cover different sections of the sector with a desired degree of overlap.

The beams 410a-c generated by each antenna element 404a-c are formed by the directivity provided by the antenna elements 404a-c and by shape and geometry of the reflector 406. The reflector 406 is shaped in order to provide the isolation required for the different sectors to operate at full capacity without interfering with the other sectors. The reflector 406 also enhances the antenna gain in the desired frequency bands. The reflector 406 has two corner reflector portions as described above with reference to FIG. 1. One of the 3-multi-band antenna elements is mounted in each of the two corner reflector portions, shown as 404a and 404c (referring to FIG. 4A). Each of the corner antennas 404a,c is placed at a point in the corner that puts its phase center about a quarter wavelength (λ/4) from the corner. The third (center) antenna 404b is placed in the center of the reflector 406 and generates the center beam 410b.

Figure 4E:
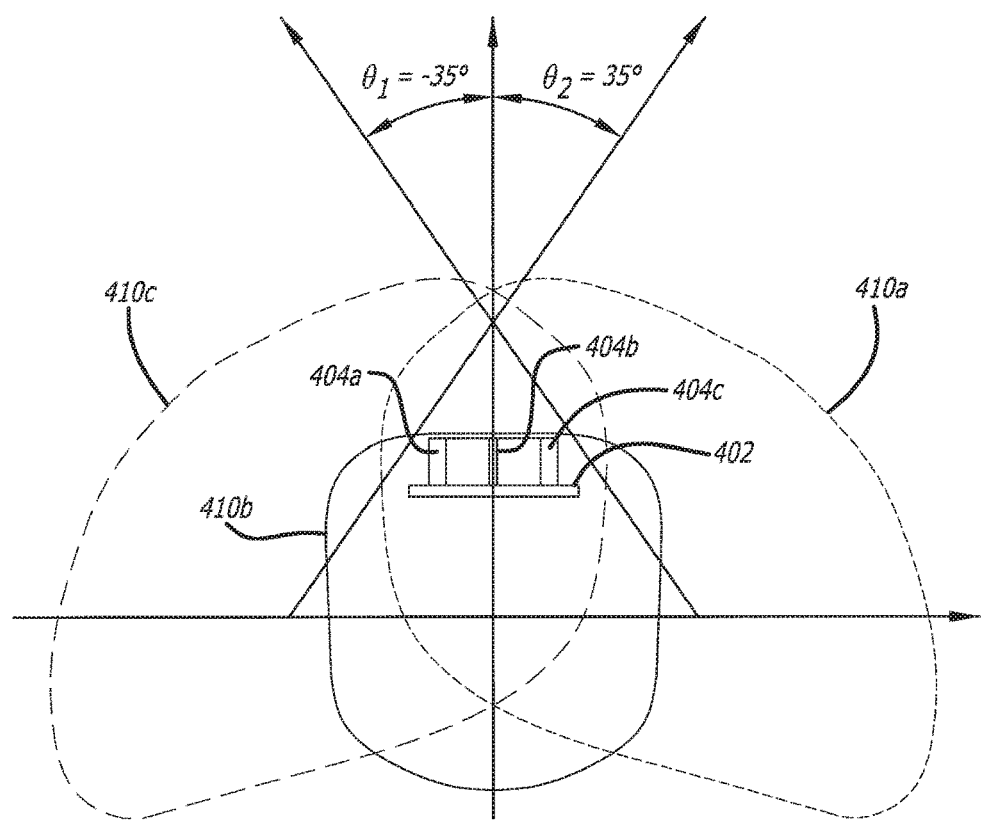

The corner antennas 404a,c, which form beams 410a,b relative to the reflector corners are positioned to generate the two beams 410a,c such that they overlap and are squinted from a boresight. FIG. 4E is a cross-sectional view of the beam patterns shown in FIG. 4A at E-E' illustrating a view of the beam patterns from a position facing the antenna arrays into the physical boresight of the antenna array 404. It is noted that the view in FIG. 4E assumes that the view in FIG. 4A is from under the RF module 400 and that the RF module 400 is installed above the users, such as on a ceiling. The view in FIG. 4E shows the first beam 410a generated by the first antenna element 404a, the center beam 410b generated by the center antenna element 404b, and the third beam 410c generated by the third antenna element 404c. The first beam 410a and the third beam 410c are shown squinted from the boresight. In an example implementation, the first and third beams 410a,c may be squinted by about +/−35°, although the squinting may be any suitable angle range. A two-element antenna array may be used resulting in the coverage pattern defined by the two overlapping corner beams 410a,b modified by configuring and orienting the antenna elements 404a,c to generate beams that adequately cover the sector. In the 3-element antenna array, the center antenna is included to generate three overlapping beams 410a-c providing the sector coverage pattern shown in FIGS. 4A and 4E. The three overlapping beams enable MIMO operation with low correlation between the two or three channels coupled to the radio receiver.

Figure 5:
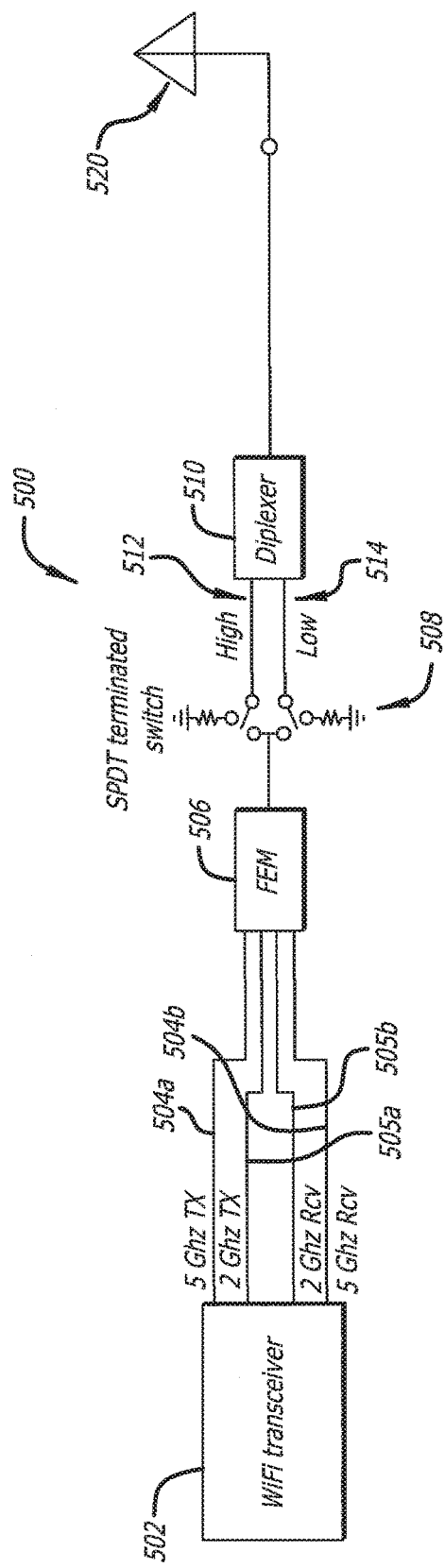
FIG. 5 is a block diagram of an example radio that may be used in an RF module that includes MIMO configured multi-band antenna arrays.

FIG. 5 is a block diagram of an example radio that may be used in an RF module that includes MIMO configured multi-band antenna arrays. FIG. 5 depicts a MIMO channel circuit 500 that may be implemented in an RF module 100 (in FIG. 1). Multiple MIMO channel circuits 500 may be used in a MIMO configured RF sector implemented with the RF module 100 (in FIG. 1). Two channel circuits 500 may be configured for a 2×2 MIMO implementation. Three channel circuits 500 may be configured for a 3×3 or a 2×3 MIMO implementation.

The MIMO channel circuit 500 in FIG. 5 includes a transceiver 502, a 5 Ghz receiver/transmitter pair 504a and 504b, a 2 Ghz receiver/transmitter pair 505a and 505b, a front-end module ("FEM") 506, band selector switch 508, a diplexer 510, a high-band line 512, a low-band line 514, and a dual-band antenna 520. The MIMO channel circuit 500 shown in FIG. 5 may be configured for operation as a 2 Ghz receiver and/or transmitter, or a 5 Ghz receiver and/or transmitter according to 802.11a/n or 802.11g/b/n.

The transceiver 502 may be any suitable radio transceiver configured for operation according to 802.11a/b/g/n standards. The transceiver 502 may be switched to operate according to one of the standards and to operate as a receiver, a transmitter, or both. Based on the switch and selected standard, the transceiver 502 enables either the 2 Ghz receiver and/or transmitter lines 504a,b or the 5 Ghz receiver and/or transmitter lines 505a,b.

The dual-band antenna 502 may include any suitable multi-band antenna, including for example, a Vivaldi notch antenna array such as the multi-band antenna array described above with reference to FIG. 3. The dual-band antenna 502 is connected to the diplexer 510. The diplexer 510 receives a signal having combined high (5 Ghz) and low (2 Ghz) signals, separates the signals and couples each to corresponding high and low connections 512, 514, which switch between high frequency and low frequency signals. In the example shown in FIG. 5, the high (5 Ghz) signal is coupled to the high connection 512, and the low signal (2 Ghz) is coupled to the low connection 514.

The high connection 512 and the low connection 514 are connected to the band selector switch 508, which may be switched to determine which signal to receive and/or transmit and to enhance the isolation between the two frequency modes. The band selector switch 508 is configured such that the un-selected connection is coupled to a resistor connected to ground. The resistor is provided with a high resistance to provide a high impedance connection for the unselected signal.

The selected signal path (i.e. high or low connection) is coupled to the FEM 506. The FEM 506 conditions the signal by using power amplifiers, low noise amplifiers, and filters for the desired signal types. In one example, the FEM 506 may be implemented using a SE595L Dual Band 802.11n Wireless LAN Font End made by SIGe Semiconductors.

The FEM 506 is connected to the 2 Ghz receiver and/or transmitter lines 504a,b or the 5 Ghz receiver and/or transmitter lines 505a,b to receive 2 Ghz or 5 Ghz signals from the wireless transceiver 502 over either the 2 Ghz or 5 Ghz transmitter lines 504a, 505a; or to couple 2 Ghz or 5 Ghz signals to the wireless transceiver 502 over either the 2 Ghz or 5 Ghz receiver lines 504b, 505b.

It will be understood that the foregoing description of numerous implementations has been presented for purposes of illustration and description. It is not exhaustive and does not limit the claimed inventions to the precise forms disclosed. For example, the above examples have been described as implemented according to IEEE 802.11a and 802.11bg. Other implementations may use other standards. In addition, examples of the wireless access points described above may use housings of different shapes, not just round housing. The number of radios in the sectors and the number of sectors defined for any given implementation may also be different. Modifications and variations are possible in light of the above description or may be acquired from practicing the invention. The claims and their equivalents define the scope of the invention.

What is claimed is:

1. A multiple input, multiple output ("MIMO") antenna system comprising:
    a plurality of multi-band antenna elements connected to a radio in a multiple MIMO configuration, the multi-band antenna elements and the radio operating on a radio frequency ("RF") module; and
    a reflector formed to contain the plurality of multi-band antenna elements and to concentrate signal communication in a sector, the plurality of multi-band antenna elements oriented to provide a sector coverage pattern formed by beam patterns generated by each of the multi-band antenna elements, the reflector having a shape that enhances gain/directivity of the antenna elements and isolation between RF modules.

2. The MIMO antenna system of claim 1 where:
    the shape of the reflector is defined by a three-sided wall that forms two corners on opposite sides of a first side positioned perpendicular to a radial axis extending from an opposite end of the RF module, the three-sided wall having an opening opposite the first side.

3. The MIMO antenna system of claim 1 where:
    each of the plurality of multi-band antenna elements includes at least one notch antenna printed on a printed circuit board where the multi-band antenna element is mounted perpendicular to the RF module with a 'V' pattern formed by the notch antenna open towards the sector.

4. A wireless local area network ("WLAN") radio frequency ("RF") module comprising:
    a printed circuit board having RF processing circuitry;
    a plurality of multi-band antenna elements connected to the RF processing circuitry in a multiple input, multiple output ("MIMO") configuration; and
    a reflector formed to contain the plurality of multi-band antenna elements and to concentrate signal communication in a sector, the plurality of multi-band antenna elements oriented to provide a sector coverage pattern formed by beam patterns generated by each of the multi-band antenna elements, the reflector having a shape that enhances gain/directivity of the antenna elements and isolation between RF modules.

5. The MIMO antenna system of claim 4 where the shape of the reflector is defined by a three-sided wall that forms two corners on opposite sides of a first side positioned perpendicular to a radial axis extending from an opposite end of the RF module, the three-sided wall having an opening opposite the first side.

6. The WLAN RF module of claim 4 where:
    each of the plurality of multi-band antenna elements includes at least one notch antenna printed on a printed circuit board where the multi-band antenna element is mounted perpendicular to the RF module with a 'V' pattern formed by the notch antenna open towards the sector.

7. The WLAN RF module of claim 4 where the RF module is configurable to communicate in accordance with either the 802.11an or the 802.11bgn standards, the RF module further comprising:
    a diplexer connected to each multi-band antenna element and to a high frequency line and a low frequency line;
    a front end module connected to either the high frequency line or the low frequency line, the front end module configured:
        to connect the high frequency line and the low frequency line to a high transmit line corresponding the high frequency line and a low transmit line corresponding to the low frequency line for radio signals being communicated from the radio to the multi-band antenna element, and to connect the high frequency line and the low frequency line to a high receive line corresponding the high frequency line and a low receive line corresponding to the low frequency line for radio signals being communicated to the radio from the multi-band antenna element.

8. A wireless LAN access device comprising:
    a plurality of RF modules radially connected to a central controller to provide a 365° coverage pattern divided into sectors of coverage pattern provided by corresponding RF modules, each RF module including:
    a printed circuit board having RF processing circuitry;
    a plurality of multi-band antenna elements connected to the RF processing circuitry in a MIMO configuration; and
    a reflector formed to contain the plurality of multi-band antenna elements and to concentrate signal communication in a sector, the plurality of multi-band antenna elements oriented to provide a sector coverage pattern formed by beam patterns generated by each of the multi-band antenna elements, where the reflector on each RF module comprises a shape that enhances gain/directivity of each of plurality of the multi-band antenna elements and isolation between each RF module.

9. The wireless LAN access device of claim 8 where the shape of the reflector on each RF module is defined by a three-sided wall that forms two corners on opposite sides of a first side positioned perpendicular to a radial axis extending from an opposite end of the RF module, the three-sided wall having an opening opposite the first side.

* * * * *